United States Patent
Fujiwara et al.

(10) Patent No.: US 6,619,245 B1
(45) Date of Patent: Sep. 16, 2003

(54) FAILSAFE CONTROL SYSTEM AND METHOD FOR AN ELECTROMAGNETICALLY DRIVEN VALVE

(75) Inventors: Keisuke Fujiwara, Yokohama (JP); Hatsuo Nagaishi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 25 days.

(21) Appl. No.: 09/831,276

(22) PCT Filed: Nov. 28, 2000

(86) PCT No.: PCT/JP00/08346

§ 371 (c)(1), (2), (4) Date: May 9, 2001

(87) PCT Pub. No.: WO01/40640

PCT Pub. Date: Jun. 7, 2001

(30) Foreign Application Priority Data

Dec. 2, 1999 (JP) ............................................. 11-343558

(51) Int. Cl.[7] ................................................. F01L 9/04
(52) U.S. Cl. ................................. 123/90.11; 123/90.15
(58) Field of Search ................. 123/90.11, 90.15–90.18, 123/90.6, 198 D; 251/129.01, 129.09, 129.1, 129.15, 129.16

(56) References Cited

U.S. PATENT DOCUMENTS

| | | | | |
|---|---|---|---|---|
| 5,215,048 A | * | 6/1993 | Kaiser et al. ............... | 123/90.6 |
| 5,636,601 A | * | 6/1997 | Moriya et al. ............ | 123/90.11 |
| 5,669,341 A | * | 9/1997 | Ushirono et al. ......... | 123/90.11 |
| 5,765,514 A | | 6/1998 | Sono et al. ............... | 123/90.11 |
| 6,024,059 A | * | 2/2000 | Kamimaru et al. ....... | 123/90.11 |
| 6,279,523 B1 | * | 8/2001 | Iida et al. ................. | 123/90.11 |
| 6,286,478 B1 | * | 9/2001 | Atago et al. ................. | 123/306 |

FOREIGN PATENT DOCUMENTS

| | | | |
|---|---|---|---|
| EP | 0 724 067 | 7/1996 | |
| EP | 0 777 038 | 6/1997 | |
| EP | 0 810 350 | 12/1997 | |
| JP | 406058235 | * 3/1994 | ............... 123/90.11 |
| JP | 9-195736 | 7/1997 | |

* cited by examiner

*Primary Examiner*—Thomas Denion
*Assistant Examiner*—Jaime Corrigan
(74) *Attorney, Agent, or Firm*—Foley & Lardner (57) ABSTRACT

A failsafe control system for a valve electromagnetically driven for opening and closing an intake port or exhaust port of an internal combustion engine is provided. The valve is of the type which is held in a neural position, i.e., in a partly open position when an electromagnetic actuator is not energized. When the valve fails in opening, the supply current is increased than that at normal times to drive the valve to close, whereby to prevent misfire, backfire and a bad influence to intake conditions of other cylinders and thereby attain an elongated service life of engine parts. A failsafe control method is also provided.

21 Claims, 7 Drawing Sheets

STROKES OF FOUR-CYCLE ENGINE

| | INTAKE | COMPRESSION | POWER | EXHAUST | INTAKE | COMPRESSION | POWER | EXHAUST |
|---|---|---|---|---|---|---|---|---|

(1) NORMAL OPERATION OF EACH VALVE

| | | | | | | | | |
|---|---|---|---|---|---|---|---|---|
| INTAKE VALVE 1 | OPENED | CLOSED | CLOSED | CLOSED | OPENED | CLOSED | CLOSED | CLOSED |
| INTAKE VALVE 2 | OPENED | CLOSED | CLOSED | CLOSED | OPENED | CLOSED | CLOSED | CLOSED |
| EXHAUST VALVE 1 | CLOSED | CLOSED | CLOSED | OPENED | CLOSED | CLOSED | CLOSED | OPENED |
| EXHAUST VALVE 2 | CLOSED | CLOSED | CLOSED | OPENED | CLOSED | CLOSED | CLOSED | OPENED |

(2) OPERATION OF EACH VALVE AT ABNORMAL TIMES

| | | | | | | | | |
|---|---|---|---|---|---|---|---|---|
| INTAKE VALVE 1 | OPENED ↔ CLOSED | CLOSED | CLOSED | CLOSED | OPENED ↔ CLOSED | CLOSED | CLOSED | CLOSED |
| INTAKE VALVE 2 | OPENED ↔ CLOSED | CLOSED | CLOSED | CLOSED | OPENED ↔ CLOSED | CLOSED | CLOSED | CLOSED |
| EXHAUST VALVE 1 | CLOSED | CLOSED | CLOSED | OPENED ↔ CLOSED | CLOSED | CLOSED | CLOSED | OPENED ↔ CLOSED |
| EXHAUST VALVE 2 | CLOSED | CLOSED | CLOSED | OPENED ↔ CLOSED | CLOSED | CLOSED | CLOSED | OPENED ↔ CLOSED |

ID-SAFE CONTROL SYSTEM AND
METHOD FOR AN
ELECTROMAGNETICALLY DRIVEN VALVE

TECHNICAL FIELD

The present invention relates to a failsafe control system for an electromagnetically driven valve for opening and closing an intake port or exhaust port of an internal combustion engine.

BACKGROUND ART

It is known to construct intake and exhaust valves of an internal combustion engine from electromagnetically driven valves and control the valves in accordance with desired opening and closing characteristics for thereby obtaining desired intake and exhaust efficiencies as disclosed in Japanese Patent Provisional Publication No. 9-195736.

DISCLOSURE OF INVENTION

In this kind of electromagnetically driven valve, an energizing current supplied to an electromagnetic actuator is controlled so as to reduce the speed of the valve at the end of movement of the valve toward a fully open position or a completely closed position (i.e., at the time of seating of the valve or contact of an armature with an electromagnet) to nearly zero and thereby make smaller a noise resulting from the seating of the valve or contact of the armature with the electromagnet. For example, when the valve is held in a half or partly open position under the urge of valve springs due to a failure in movement of the valve toward the fully open position or the completely closed position, which is caused, for example, by an increased pressure within a cylinder or an increased friction against movement of the valve, there will be caused not only a misfire due to an insufficiently compressed mixture but a backfire due to simultaneous opening of the intake and exhaust valves, which provides communication between an intake system and an exhaust system and an influence to intake conditions (e.g., pressure and composition) of other cylinders.

SUMMARY OF THE INVENTION

It is accordingly an object of the present invention to a failsafe control system and method for an electromagnetically driven valve of an internal combustion engine which can solve the above noted problems inherent in the prior art systems.

It is a further object of the present invention to provide a failsafe control system and method for electromagnetically driven intake and exhaust valves of an internal combustion engine which can provide a proper failsafe control in case of malfunction of the valves.

To accomplish the above objects, there is provided according to an aspect of the present invention a failsafe control system for a valve electromagnetically driven by an actuator for opening and closing a combustion chamber of an internal combustion engine, the actuator having a pair of electromagnets, an armature interposed between the electromagnets and attached to the valve, and a pair of springs disposed on the opposite sides of the armature for urging the valve toward a neutral position, the failsafe control system comprising a control unit which includes a determining section that determines whether the valve can be moved into an open position at the time the valve is driven to open, and a failsafe section that drives the valve to a close position when the determining section determines that the valve cannot be moved into the open position.

According to another aspect of the present invention, there is provided a f safe control method for a valve electromagnetically driven by an actuator for opening and closing a combustion chamber of an internal combustion engine, the actuator having a pair of electromagnets, an armature interposed between the electromagnets and attached to the valve, and a pair of springs disposed on the opposite sides of the armature for urging the valve toward a neutral position, the method comprising determining whether the valve can be moved into an open position at the time the valve is driven to open, and driving the valve to a close position when it is determined that the valve cannot be moved into the open position.

BEST MODE FOR CARRYING OUT THE INVENTION

Figure 1:
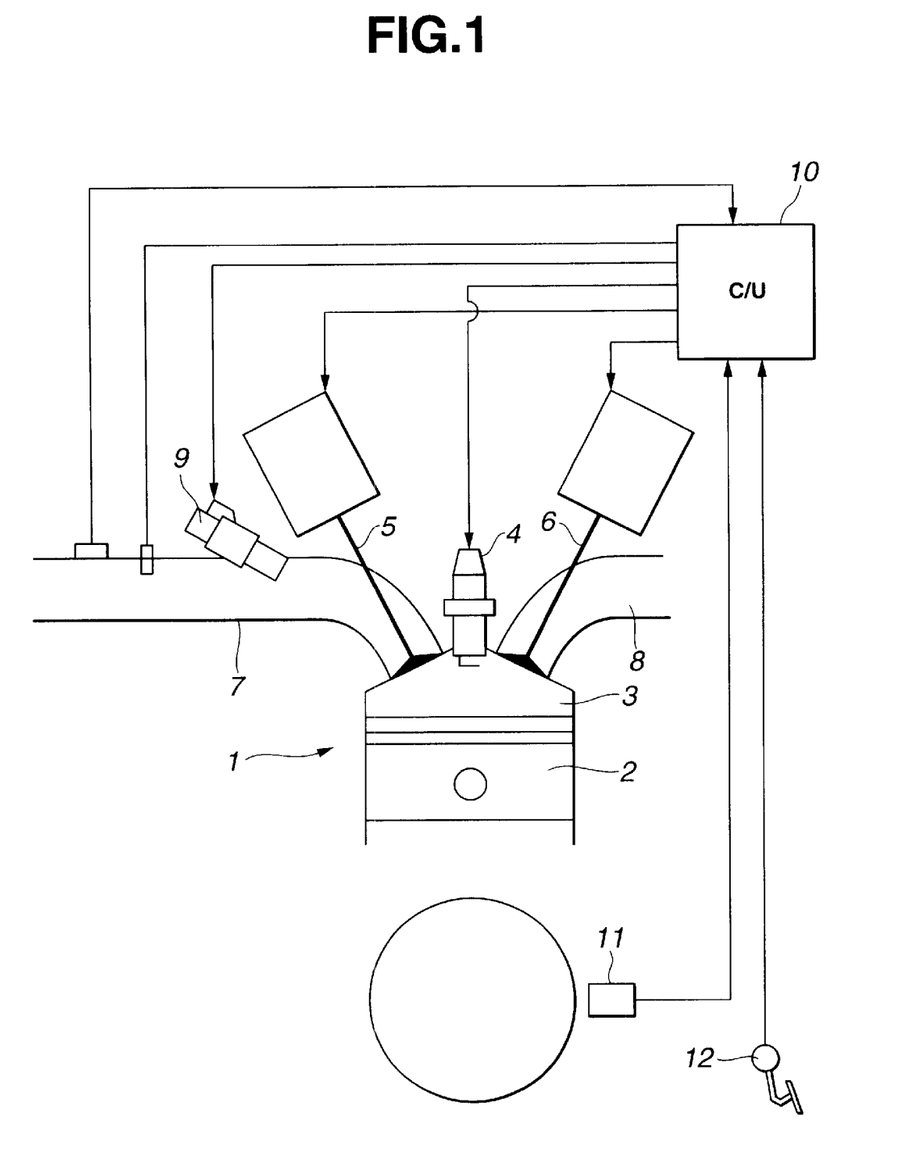
FIG. 1 is a schematic view of an internal combustion engine provided with a failsafe control system according to an embodiment of the present invention.

Referring first to FIG. 1, an internal combustion engine is generally indicated by 1 and has piston 2 and combustion chamber 3 at each cylinder. In combustion chamber 3 is provided a pair of intake valve 5 and exhaust valve 6. Engine 1 further has an intake system including intake passage or pipe 7 and an exhaust system including exhaust passage or pipe 8.

Figure 2:
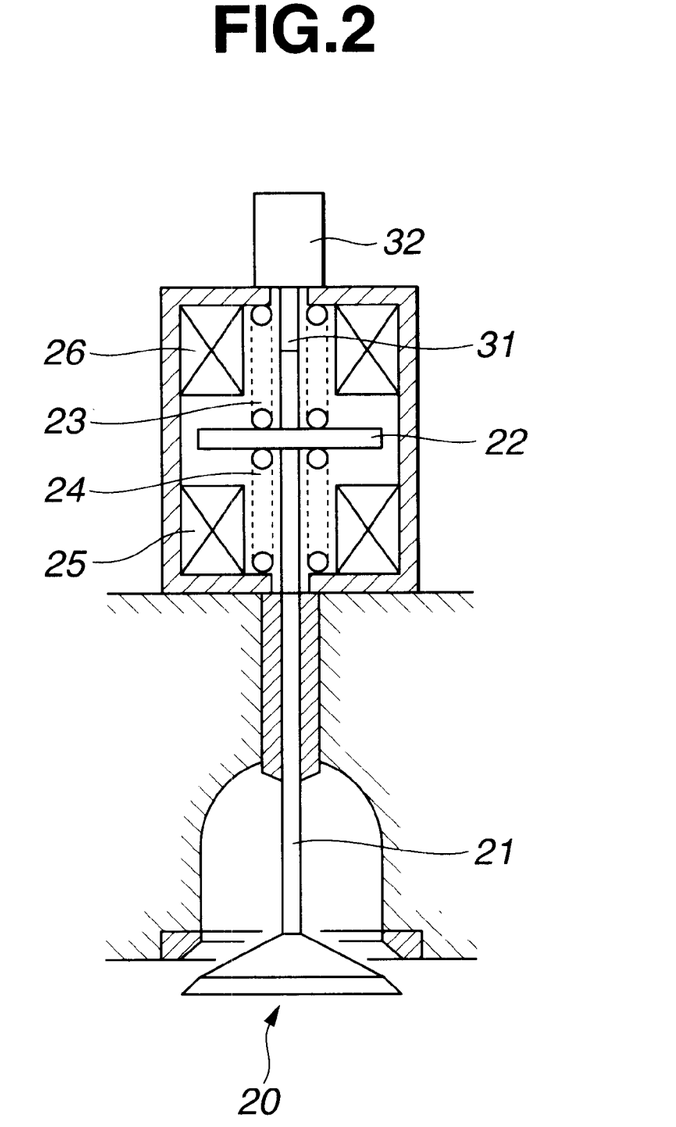
FIG. 2 is a schematic sectional view of an electromagnetic actuator for electromagnetically driving an intake valve or exhaust valve of the engine of FIG. 1.

Intake and exhaust valves 5 and 6 are electromagnetically driven by an electromagnetic actuator which is constructed basically as shown in FIG. 2 wherein generally indicated by 20 is an electromagnetically driven valve representative of either of intake valve 4 and exhaust valve 5. The actuator includes movable element or armature 22 in the form of a disc and attached to valve stem 21 of valve 20 to move therewith. Armature 22 is urged by springs 25 and 26 toward a neutral position where valve 20 partly opens as shown in FIG. 2. Upper electromagnet 26 and lower electromagnet 25 are disposed under and above armature 22, respectively. Each electromagnet consists of a coil and a core.

For opening valve 20, upper electromagnet 26 is deenergized and lower electromagnet 25 is energized to attract armature 22 downward thereto for thereby causing valve 20 to move away from its associated seat to open a port. On the contrary, for closing valve 20, lower electromagnet 25 is deenergized and upper electromagnet 26 is energized to attract armature 22 upward thereto for thereby causing valve 20 to be placed on its associated seat to close a port.

To an upper end of valve stem 21 is connected detection rod 31 of lift sensor 32 which is disposed on the upper end of a housing (no numeral) of the actuator. Lift sensor 32 detects a lift of valve 20 from the amount of movement of detection rod 31. Other lift sensors 32 can also be used, such as a contactless type distance measuring sensor using an infrared-ray or ultrasonic wave.

Referring back to FIG. 1, intake pipe 7 is further provided with electromagnetic fuel injection valve 9.

The operations of intake valve 5, exhaust valve 6, fuel injection valve 9 and spark plug 4 are controlled by electronic control unit 10. To control unit 10 is supplied a signal from crank angle sensor 11. Crank angle sensor 11 outputs a crank angle signal in timed relation to engine speed and is thereby capable of detecting engine speed. Further supplied to control unit 10 are signals from accelerator pedal sensor 12 for detecting an amount of acceleration pedal operation (i.e., amount of acceleration pedal depression) and lift sensors 32 for detecting lifts of intake valve 5 and exhaust valve 6.

Based on engine operating conditions, opening and closing of intake valve 5 and exhaust valve 6 is controlled together with the ignition timing and the fuel injection quantity. In this instance, at the time intake valve 5 or exhaust valve 6 is driven to open, it is determined whether intake valve 5 or exhaust valve 6 can be moved into the fully open positions. In case it is determined that intake valve 5 or exhaust valve 6 cannot be moved into the fully open position, a failsafe control is performed by the control unit 10 to drive intake valve 5 or exhaust valve 6 to close.

The failsafe control will be described in detail with reference to the flowchart of FIG. 3.

In step S1, it is determined whether it is the time for a predetermined valve (i.e., intake valve 5 or exhaust valve 6) to be driven to open.

If it is determined in step S1 that it is the time for the valve to be driven open, operation proceeds to step S2. In step S2, a target valve lift curve (i.e., curve representative of valve lift in relation to time) and an actual valve lift curve (i.e., curve representative of actual behavior of the valve in relation to time) are compared.

In step S3, it is determined whether the valve can be moved into the fully open position (i.e., the position where armature 22 is in contact with lower electromagnet 25). Specifically, comparison between the actual valve lift curve and the target valve lift curve is made at an interval of a predetermined period from the time the valve starts being driven to open or from the time the valve lift increases to a predetermined value which is smaller than the maximum lift (i.e., the lift at the time the valve is fully open). If the actual valve lift curve deviates from the target valve lift curve by a predetermined amount, it is determined that the valve is stalled and cannot be moved into the fully open position. In FIG. 4, the target valve lift curve is represented by the solid line curve, and an allowable range of valve lift variation is indicated by the area between the dotted line curves. If a deviation of the actual valve lift curve from the target valve lift curve is within the area between the dotted line curves, it is determined that the valve can be moved into the fully open position. If the deviation is so large as to go beyond the dotted line curves, i.e., the deviation is not within the area between the dotted line curves, it is determined that the valve cannot be moved into the fully open position. In the meantime, the above described target curve is set so that the speed of the valve immediately before arrival at the fully open position becomes equal to a predetermined value (e.g., 0.1 m/s). However, the allowable range of valve lift variation, that enables the valve to be moved into the fully open position, varies with lapse of time, so that the above described predetermined amount of deviation is set variably every time of determination. Otherwise, such a structure will do in which the speed of the valve is calculated with predetermined time intervals for comparison with a target speed of the valve and if the calculated speed of the valve is lower than the target speed by a predetermined amount or more, it is determined that the valve cannot be moved into the fully open position.

If it is determined in step S3 that the valve Cannot be moved into the fully open position, operation proceeds to step S4. In step S4, it is determined whether the valve, when driven to open in next or subsequent cycle, can be moved into the fully open position. Specifically, if a deviation of the actual valve lift from the target valve lift curve is so large as to go beyond the chain line curves in FIG. 4, it is determined that the valve cannot be moved into the fully open position in next or subsequent cycle. In this connection, if it is determined in step S4 that the valve cannot be moved into the fully open position, it will be seen from this that the valve cannot be moved into the fully open position even if a failsafe control which will be described hereinlater is executed, by reason that, for example, the valve seizes up in the middle of valve lift due to some foreign substance caught in the actuator.

If it is determined in step S4 that the valve can be moved into the fully open position in next or subsequent cycle, a driving control for the valve to close is executed in steps S5 and S6. In this instance, the cent energizing the coil of the electromagnet is increased as compared with that for normal driving control for the valve to close so that the valve can be moved into the fully closed position assuredly.

Figure 5A:
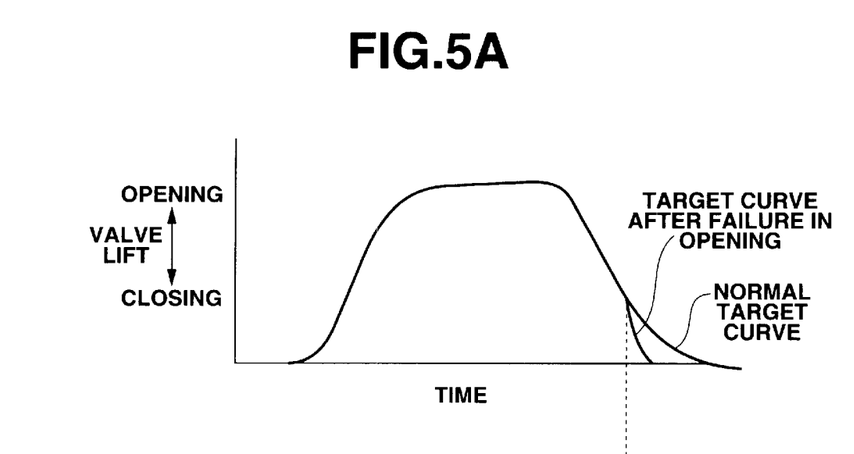
FIG. 5A is a time chart showing a target valve lift curve after failure in opening by comparison with a target valve lift curve at normal times.
Figure 5B:
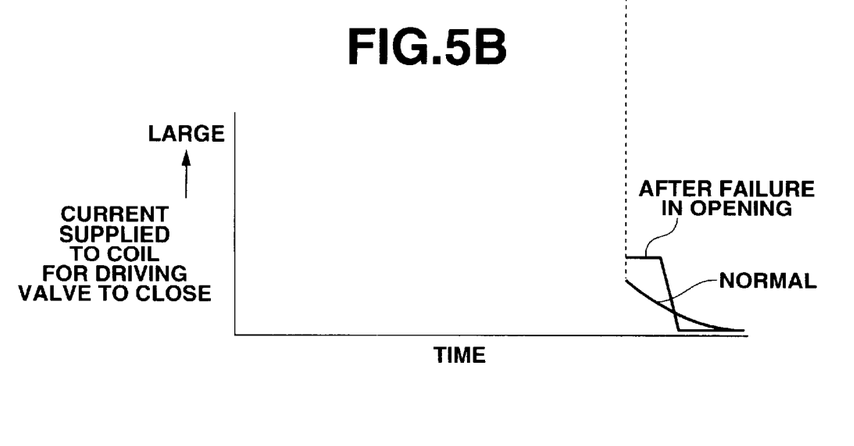
FIG. 5B is a time chart showing a current supplied to a coil of an electromagnet of the actuator for driving the valve to close after failure in opening, by comparison with a corresponding current at normal times.

In step S5, an energizing pattern for energizing the coil of the electromagnet at the time for the valve to be driven to open under the above described failsafe control is determined. As shown in FIGS. 5A and 5B, in case the valve cannot be moved into the fully open position, an energizing control which starts from the time the valve lift becomes smaller than a predetermined value and is continued till the valve is moved into the completely closed position is executed in accordance with such a pattern in which the energizing current at the initial stage of control is set at a lager value than at normal times, maintained at the larger value for a predetermined time and thereafter caused to reduce rapidly to a holding current.

In step S6, a driving control for the valve to close is executed in accordance with the energizing pattern determined in step S5, whereby to move the valve into the completely closed position.

In step S7, it is determined whether it is the time for the valve to be driven to open in subsequent cycle. If it is determined in step S7 that it is the time for the valve to be driven to open, operation proceeds to step S8. In step S8, the energizing pattern for the valve to be driven to open under the above described failsafe control is determined. In this connection, the energizing pattern is determined so that a target valve lift curve representative of valve lift in relation to time is obtained.

Figure 6:
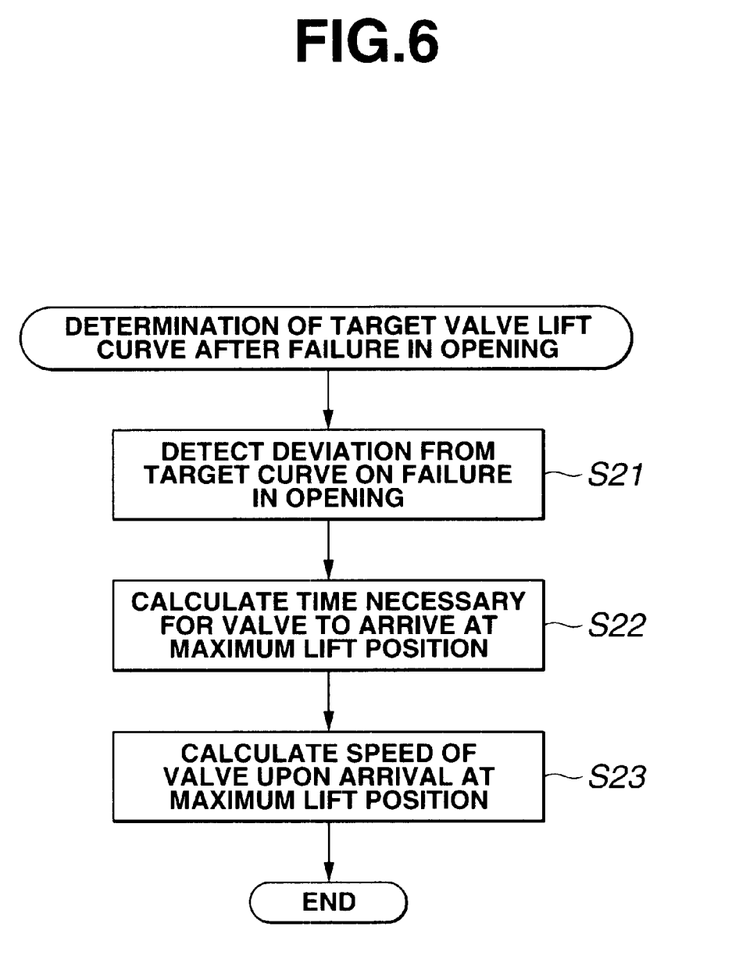
FIG. 6 is a flowchart of a subroutine performed by the control unit of the engine of FIG. 1 for determining a target valve lift curve after failure in opening.

FIG. 6 shows a subroutine for determining a target valve lift curve to be used at the time for the valve to be driven to open after a failure in opening.

In step S21, it is calculated a deviation of the actual valve lift curve from the target curve at a predetermined timing in the previous failure in opening.

Figure 7:
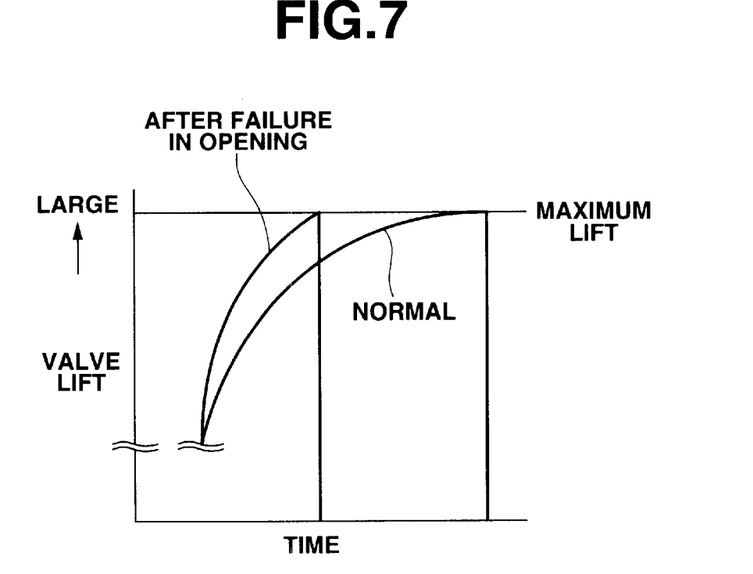
FIG. 7 is a graph showing a valve lift curve after failure in opening by comparison with a normal valve lift curve.

In step S22, the time for the valve to arrive at the maximum lift position, i.e., the fully open position (refer to FIG. 7) is calculated on the basis of the above described deviation. The time for the valve to arrive at the maximum lift position increases with increase of the deviation.

In step S23, the speed of the valve at the time of arrival at the maximum lift position (refer to FIG. 7) is calculated on the basis of the above described deviation. The speed of the valve at the time of arrival at the maximum lift position increases with increase of the deviation. However, the speed of the valve is determined within such a range that does not cause any damage of the valve at the time of seating or contact with the electromagnet (e.g., energizing current is determined so as to be 50A or less).

Figure 3:
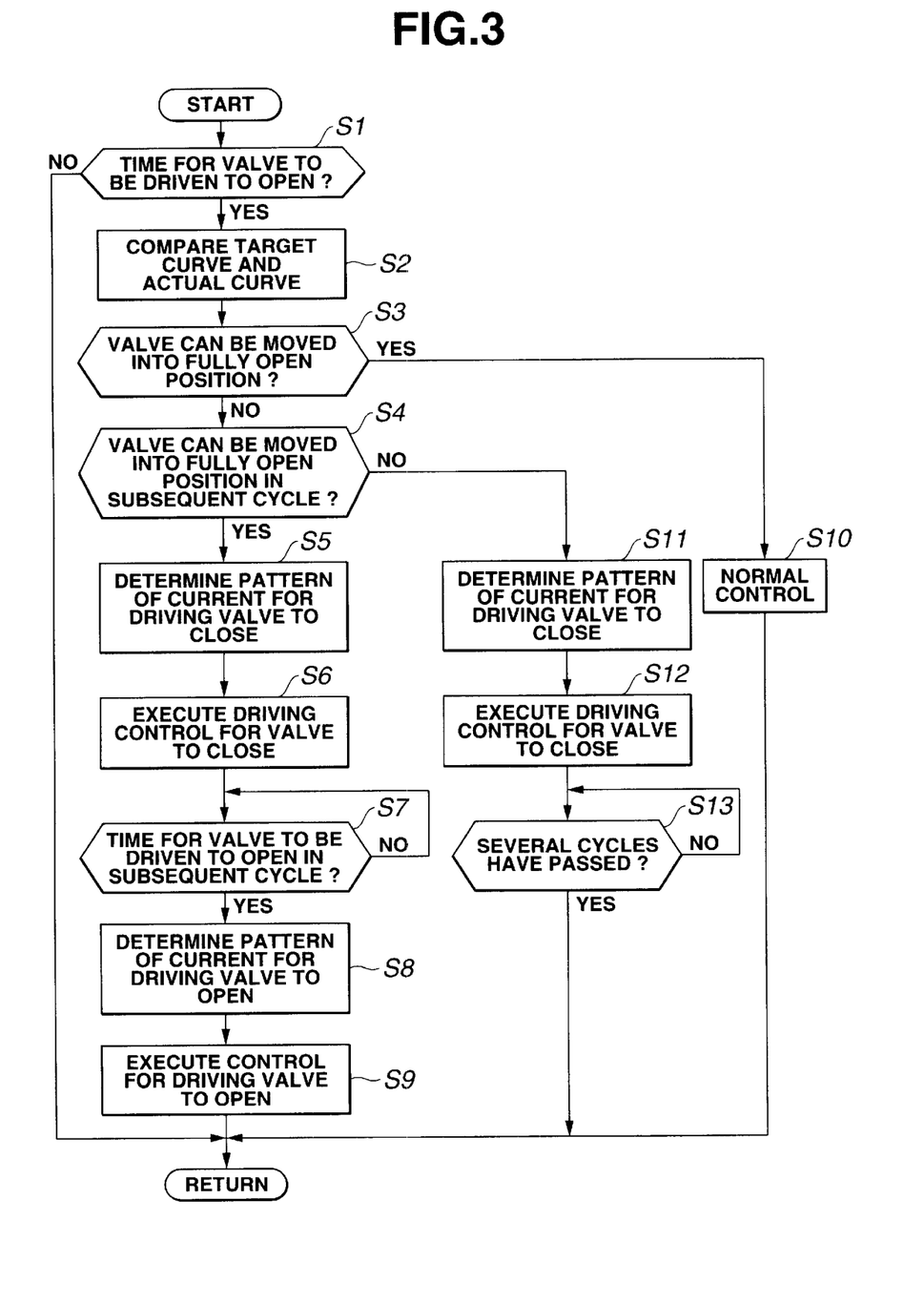
FIG. 3 is a flowchart of a control routine performed by a control unit of the engine of FIG. 1 for controlling opening and closing of the intake and exhaust valves.
Figure 4:
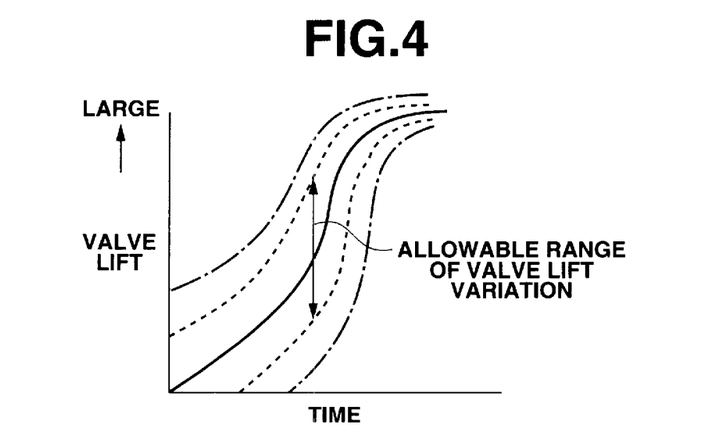
FIG. 4 is a graph showing the valve lift characteristics of the intake and exhaust valves of the engine of FIG. 1, wherein it is indicated an allowable range of valve lift variation that enables the valve to fully open, i.e., it is indicated that the valve can be fully opened so long as the valve lift for time is included within the area between dotted line curves.
Figure 8:
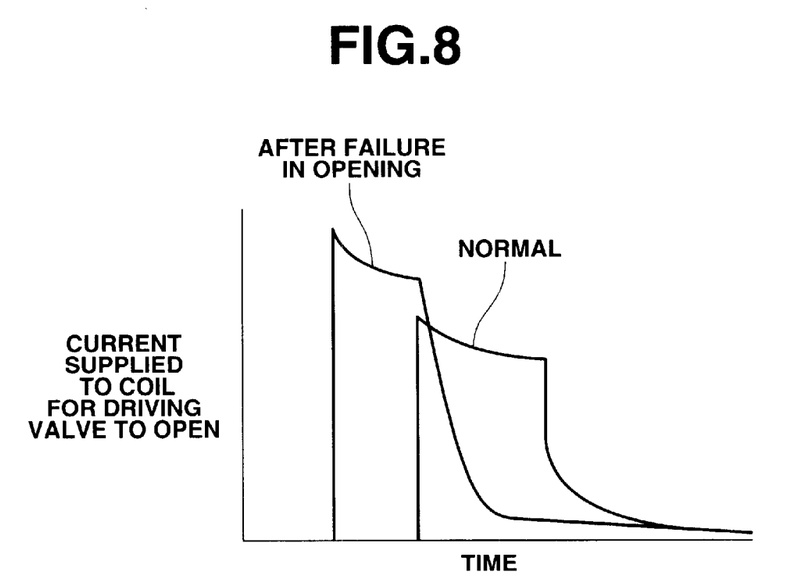
FIG. 8 is a graph showing a current supplied to a coil of an electromagnet of the actuator for driving the valve to open after failure in opening by comparison with a normal current.

Based on the time for the valve to arrive at the maximum lift position and the speed of the valve at the time of arrival at the maximum lift position, which are calculated in the above described manner for obtaining the target valve lift curve, the energizing pattern is determined in step S8 in FIG. 3 (refer to FIG. 8).

In step S9, in accordance with the above described energizing pattern, the driving control for the valve to open is executed to move the valve into the fully open position.

Further, if it is judged in step S3 that the valve can be moved into the fully open position, operation proceeds to step S10. In step S10, a normal driving control for the valve to open is executed, and it is also executed from the time onward.

Further, if it is determined in step S4 that the valve cannot be moved into the fully open position in the subsequent cycle, it is judged that the valve cannot be moved to the fully open position for a while and operation proceeds to steps S11 and S12. In steps S11 and S12, the energizing pattern at the time for the valve to be driven to close after failure in opening is determined similarly to steps S5 and S6, and the driving control for the valve to close is executed in accordance with the pattern for thereby moving the valve into the completely closed position. Then, operation proceeds to step S13. In step S13, the number of cycles passed is counted and it is determined whether several cycles during which the valve is held closed, have passed.

Figure 9:
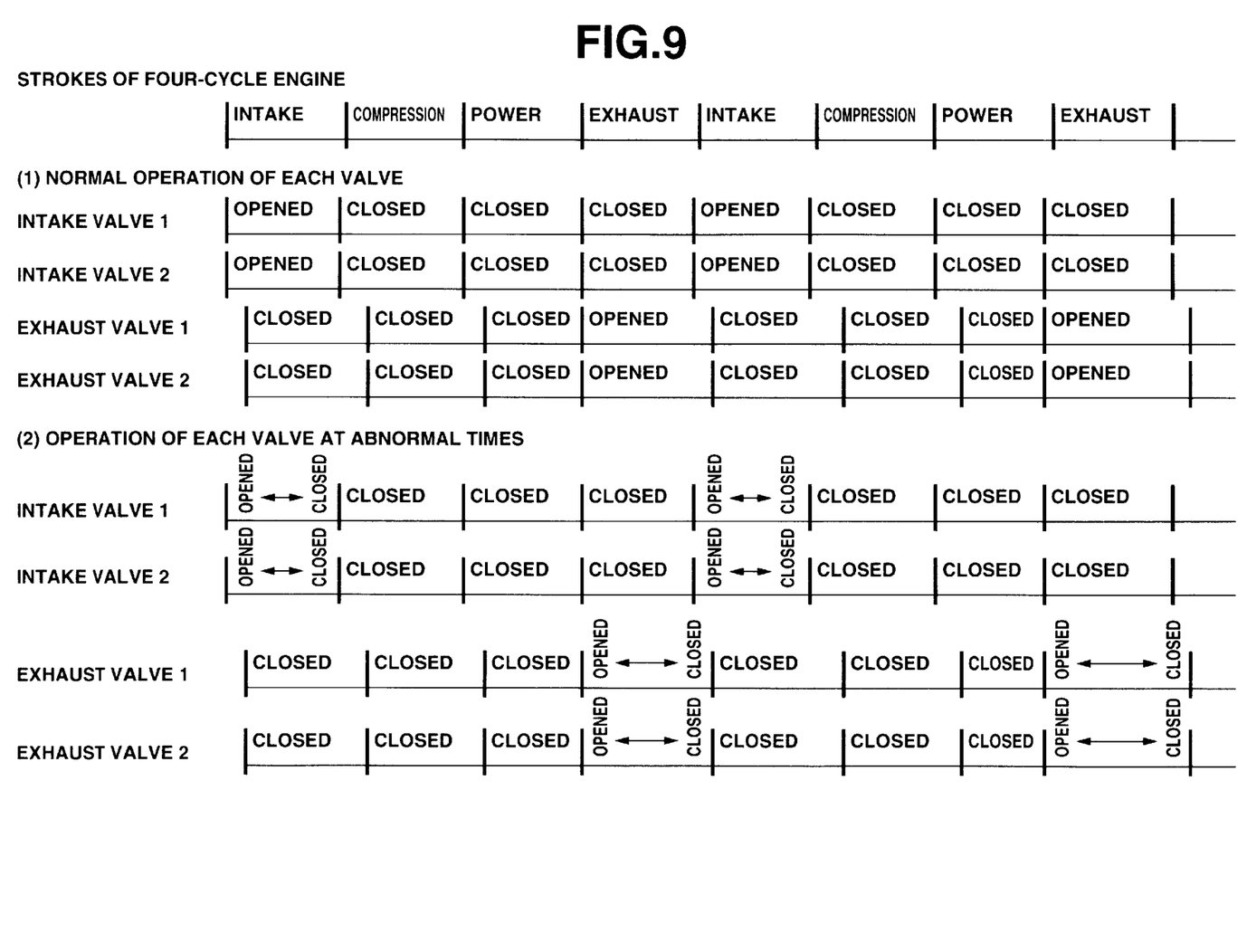
FIG. 9 is a time chart showing an opening and closing control executed on failure in opening of the intake and exhaust valves of FIG. 1 by comparison with a normal control.

Such a control is exercised over intake valves 5 and exhaust valves 6 of all the cylinders. FIG. 9 shows the opening and closing control of the intake and exhaust valves of a predetermined cylinder of a 4-stroke cycle engine having two intake valves and two exhaust valves at each cylinder, at the time the intake and exhaust valves fail in opening, by comparison with the control at normal times.

By this, in case the valve falls in opening due to an excessively high pressure prevailing within the cylinder or an increased friction caused at the time for the valve to be driven to open, a driving control for the valve to close is executed instead of a driving control for the valve to open, whereby it becomes possible to prevent occurrence of a misfire due to non-compression, backfire and an influence to an intake condition to other cylinders. In the meantime, in case of an engine having a plurality of intake valves and a plurality of exhaust valves at each cylinder, if one intake valve or one exhaust valve of a certain cylinder fails in opening, the failed valve may be forced to be closed. In such a case, it may be possible to allow the cylinder in question to conduct a combustion operation (power stroke) by using the remaining intake and exhaust valves though the engine performance efficiency is lowered.

Further, by making the supply current at the time of driving the valve to close larger than at normal times, the valve can be closed assuredly.

Further, in case the valve cannot be fully open, the target valve lift curve from the next cycle and onward is modified as compared with that at normal times, whereby the valve can be opened assuredly.

Further, in case it is detected such a condition wherein, for example, a foreign substance or the like is caught in the electromagnetic actuator to cause the valve to stop or seize up before being fully open at the time for the valve to be driven to open, i.e., in case there is a high probability that the valve cannot be opened even if it is driven to open at the time for the valve to open, the valve is held in a closed condition for at least a predetermined period hereby it becomes possible to prevent occurrence of the above described disadvantages.

Further, in case, in an engine having a plurality of electromagnetically driven type intake or exhaust valves at each cylinder, the current supplied to the actuators is increased for the above described failsafe, it may be executed such a control for differing the timings at which the valves are opened or closed, respectively, whereby the noises resulting from seating of the valves or from contact of the armatures with the electromagnets do not occur at the same time and therefore the noise resulting from the seating or contact can be reduced.

The entire contents of Japanese Patent Application No. P11-343558 (filed Dec. 2, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with ref to the following claims.

What is claimed is:

1. A failsafe control system for an electromagnetically driven valve for opening and closing a combustion chamber of an internal combustion engine, comprising:
   means for determining whether the electromagnetically driven valve can be moved into an open position on the basis of an actual behavior of the valve represented by a valve lift while the valve moves toward the open position; and
   means for driving the electromagnetically driven valve to a close position when the means for determining determines that the valve cannot be moved into the open position.

2. A failsafe control method for a valve electromagnetically driven by an actuator for opening and closing a combustion chamber of an internal combustion engine, the actuator having a pair of electromagnets, an armature interposed between the electromagnets and attached to the valve, and a pair of springs disposed on the opposite sides of the armature for urging the valve toward a neutral position, the method comprising:

determining whether the valve can be moved into an open position on the basis of an actual behavior of the valve represented by a valve lift while the valve moves toward the open position; and driving the valve to a close position when it is determined that the valve cannot be moved into the open position.

3. A failsafe control method according to claim 2, wherein when it is determined that the valve cannot be moved into the open position, the valve is closed for a preset time and thereafter the valve is driven with an electrical power increased as compared with that at normal times.

4. A failsafe control method according to claim 3, wherein the engine includes a plurality of valves electromagnetically driven for opening and closing the combustion chamber, the plurality of valves being driven to close positions at different timings.

5. A failsafe control method according to claim 2, wherein the valve lift is detected by a lift sensor.

6. A failsafe control method according to claim 5, wherein determining whether the valve can be moved into an open position determines that the valve cannot be moved into the open position when the valve lift deviates from a target valve lift by at least a predetermined value.

7. A failsafe control method according to claim 2, wherein the valve is driven along a target valve lift curve after determining that the valve cannot be moved into the open position, the target valve lift curve being different from that at normal times.

8. A failsafe control method according to claim 2, wherein the method executing an energizing control which starts from the time a lift of the valve becomes smaller than a predetermined value and continues till the valve is moved into the close position, in accordance with a pattern in which a current supplied to the actuator is set at a larger value at the initial stage of the energizing control than at normal times, maintained at the larger value for a predetermined time and thereafter caused to reduce rapidly to a holding current.

9. A failsafe control method according to claim 2, wherein the valve is held at the close position at least for a predetermined period after driving the valve to the close position.

10. A failsafe control system for a valve electromagnetically driven by an actuator for opening and closing a combustion chamber of an internal combustion engine, the actuator having a pair of electromagnets, an armature interposed between the electromagnets and attached to the valve, and a pair of springs disposed on the opposite sides of the armature for urging the valve toward a neutral position, the failsafe control system comprising:

a determining section that determines whether the valve can be moved into an open position on the basis of an actual behavior of the valve represented by a valve lift while the valve moves toward the open position; and a failsafe section that drives the valve to a close position when the determining section determines that the valve cannot be moved into the open position.

11. A failsafe control system according to claim 10, wherein when said determining section determines that the valve cannot be moved into the open position, the valve is closed for a preset time and thereafter the valve is driven with an electrical power increased as compared with that at normal times.

12. A failsafe control system according to claim 11, wherein the engine includes a plurality of valves electromagnetically driven for opening and closing the combustion chamber, the failsafe section driving the plurality of valves to close positions at different timings.

13. A failsafe control system according to claim 10, wherein the valve lift is detected by a lift sensor.

14. A failsafe control system according to claim 13, wherein the determining section determines that the valve cannot be moved into the open position when the valve lift deviates from a target valve lift by at least a predetermined value.

15. A failsafe control system according to claim 13, wherein the valve is driven along a target valve lift curve after the determining section determines that the valve cannot be moved into the open position, the target valve lift curve being different from that at normal times.

16. A failsafe control system according to claim 10, wherein the failsafe section executes an energizing control which starts from the time a lift of the valve becomes smaller than a predetermined value and continues till the valve is moved into the close position, in accordance with a pattern in which a current supplied to the actuator is set at a larger value at the initial stage of the energizing control than at nor maintained at the larger value for a predetermined time and thereafter caused to reduce rapidly to a holding current.

17. A failsafe control system according to claim 10, wherein the valve is held at the close position at least for a predetermined period after the failsafe section drives the valve to the close position.

18. A failsafe control system according to claim 10, wherein the valve opens and closes an intake port of the engine.

19. A failsafe control system according to claim 10, wherein the valve opens and closes an exhaust port of the engine.

20. A failsafe control system for a valve electromagnetically driven by an actuator for opening and closing a combustion chamber of an internal combustion engine, the actuator having a pair of electromagnets, an armature interposed between the electromagnets and attached to the valve, and a pair of springs disposed on the opposite sides of the armature for urging the valve toward a neutral position, the failsafe control system comprising:

a determining section that determines whether an actual valve lift profile is within a set range of a target value lift profile on the basis of the actual valve lift profile measured while the valve moves toward an open position; and a failsafe section for taking a corrective action when said determining section determines that the actual valve lift profile is not within the set range of the target value lift profile, wherein if said determining section determines that the valve cannot be moved into the open position, the failsafe section causes the valve to be closed for a preset time.

21. A failsafe control system for a valve electromagnetically driven by an actuator for opening and closing a combustion chamber of an internal combustion engine, the actuator having a pair of electromagnets, an armature interposed between the electromagnets and attached to the valve, and a pair of springs disposed on the opposite sides of the armature for urging the valve toward a neutral position, the failsafe control system comprising:

a determining section that determines whether an actual valve lift profile is within a set range of a target value lift profile on the basis of the actual valve lift profile measured while the valve moves toward an open position; and     a failsafe section for taking a corrective action when said determining section determines that the actual valve lift profile is not within the set range of the target value lift profile, wherein when said determining section determines that the actual valve lift profile is not within a set range of a target value lift profile the failsafe section causes the valve to be driven with an electrical power increased as compared with that at normal times.

* * * * *